Feb. 2, 1932.  W. C. STARKEY ET AL  1,843,523
TRANSMISSION
Filed Aug. 16, 1926   2 Sheets-Sheet 1
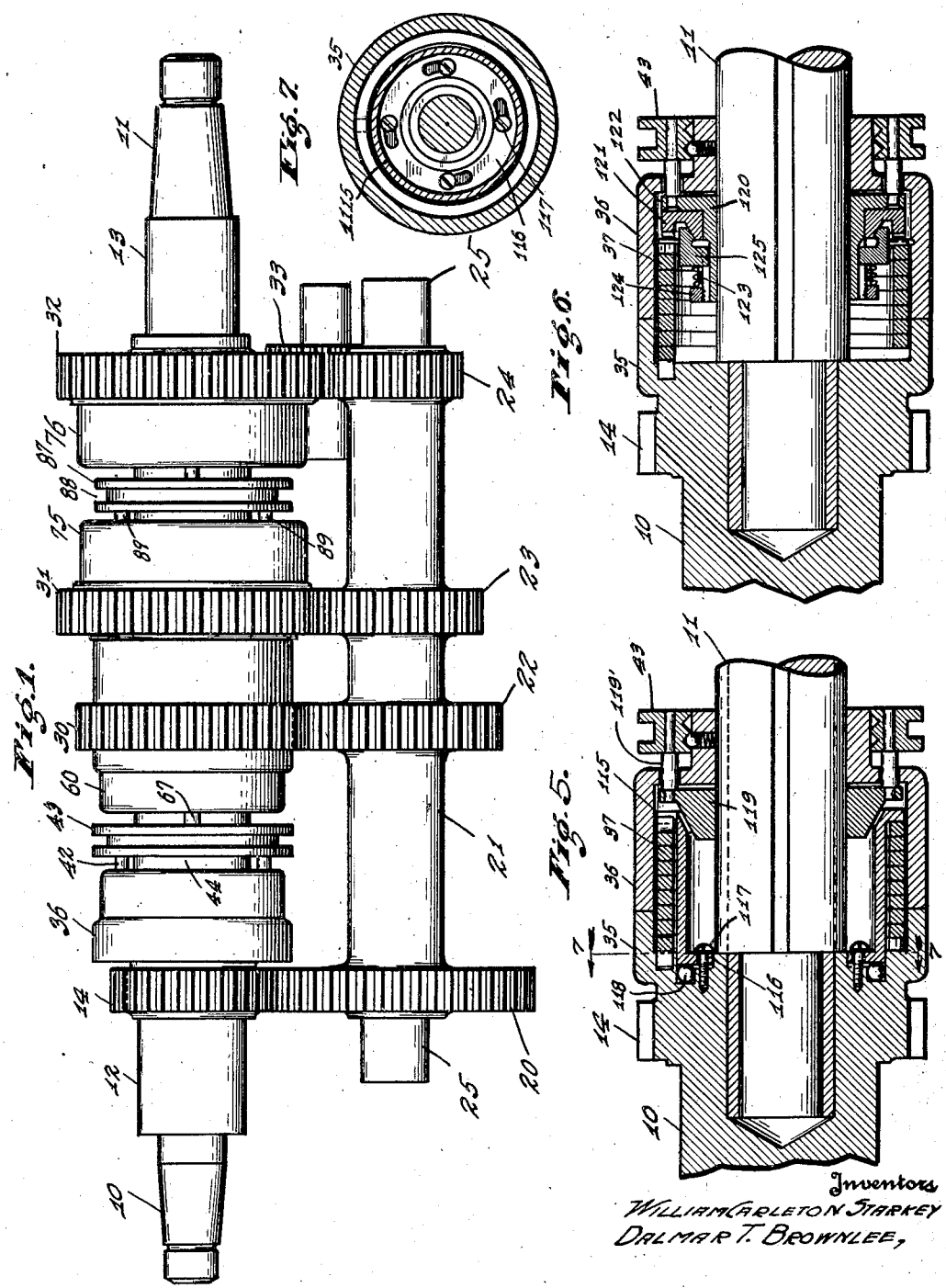
Inventors
WILLIAM CARLETON STARKEY
DALMAR T. BROWNLEE,
By
Attorney

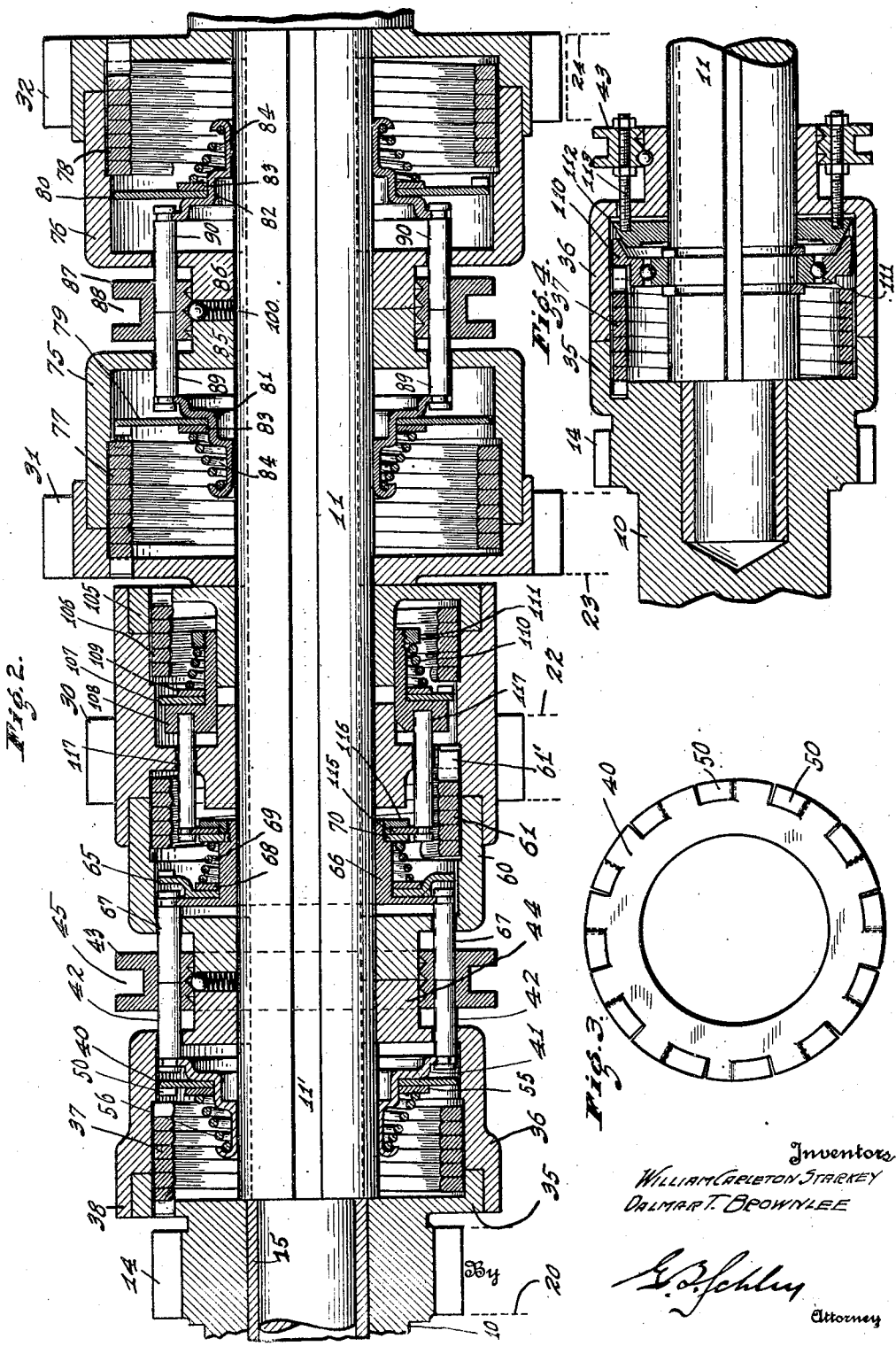

Patented Feb. 2, 1932

1,843,523

UNITED STATES PATENT OFFICE

WILLIAM CARLETON STARKEY AND DALMAR T. BROWNLEE, OF INDIANAPOLIS, INDIANA, ASSIGNORS TO L. G. S. DEVICES CORPORATION, OF INDIANAPOLIS, INDIANA, A CORPORATION OF INDIANA

TRANSMISSION

Application filed August 16, 1926. Serial No. 129,818.

It is the object of our invention to produce a geared change-speed power-transmission mechanism of the type in which two shafts are interconnected by a plurality of trains of gears having different ratios and in which a clutch is provided for each train of gears in order that such gear train may be rendered operative or inoperative as desired. More specifically, it is our object to produce such a transmission mechanism in which the clutches may be operated at all times without clashing.

We accomplish the above object by interconnecting a driving and a driven shaft with a plurality of gear trains having different gear ratios and we provide each gear train with a clutch to render such gear train operative or inoperative at will, each of such clutches embodying a coil-spring which may be operated to clutch together two relatively rotatable parts in its associated gear train.

The accompanying drawings illustrate our invention: Fig. 1 is a plan view of our transmission removed from its associated housing; Fig. 2 is a longitudinal section on an enlarged scale showing the parts carried by the driving and driven shafts; Fig. 3 is an end elevation of one of the clutch-actuating members employed in the clutches in Fig. 2; Figs. 4, 5, and 6 are modified forms of clutch-actuating means which may be used in our device; and Fig. 7 is a transverse section on the line 7—7 of Fig. 5.

The drawings illustrate a transmission mechanism particularly adapted for use in an automobile, but it will be evident that our transmission is not limited to such use. In the drawings and throughout the specification it will be assumed that the driving shaft of the transmission may be connected to rotate with an automobile engine which rotates, as practically all automobile engines now do, in a clockwise direction when viewed from the front of the automobile. The parts of our transmission as illustrated and described are arranged so that the transmission may be used with its driving shaft rotating in such direction, but it will be evident that our transmission is not limited to such use, as its parts can be rearranged to provide for rotation in either direction.

Our transmission is employed to interconnect a driving shaft 10 and a driven shaft 11, the former of which may be connected through the usual friction-clutch mechanism with an automobile engine and the latter of which may be connected through the usual propeller shaft and universal joint or joints with the rear axle of the automobile. The shafts 10 and 11 are provided respectively with bearing portions 12 and 13 adapted to be received in suitable bearings in the usual transmission housing (not shown). At its rear end, the shaft 10 is provided with a gear 14. The shaft 11 extends forwardly from the bearing portion 13, and its forward end is received in an axial recess in the rear end of the driving shaft 10, and preferably in a bearing metal sleeve 15 in such axial recess.

The gear 14 meshes with a gear 20 carried by a jack-shaft 21 which also carries an intermediate-speed gear 22, a low-speed gear 23, and a reverse gear 24. The gears 20, 22, 23, and 24 are all rigid with each other and with the jack-shaft 21, the latter being provided at its ends with suitable bearing portions 25 adapted to be received in bearings in the transmission housing.

Rotatably supported from the driven shaft 11 are gears 30 and 31 which mesh respectively with the gears 22 and 23 of the jack-shaft. The driven shaft 11 also carries a gear 32 arranged to be driven from the reverse gear 24 through an idler gear 33.

The gear 14 carried by the driving shaft and the gears 30 and 31 rotatably supported from the driven shaft are always in mesh respectively with their associated gears on the jack-shaft 21, and the gears 24 and 32 are always in mesh with the idler gear 33. By providing clutches which operate respectively between the shaft 11 and the shaft 10, between the shaft 11 and the gear 30, and between the shaft 11 and the gear 31, the shaft 11 may be driven at various forward speeds relative to the shaft 10. By providing a clutch between the shaft 11 and the gear 32, the shaft 11 may be rotated in a direction opposite to the direction of rotation of the shaft 10 because of the interposition of the idler gear 33 between the gears 24 and 32.

The high-speed or direct-drive clutch operates directly between the shafts 10 and 11. It comprises a cup 35 rotatable with the shaft 10, a cup 36 rotatable with the shaft 11, and a coil spring 37 located within such cups. The coil spring 37 has an external diameter slightly less than the internal diameter of said cups, and the cups are therefore normally free to rotate relatively to each other. If one end of the spring 37 is operatively connected to one cup and the other end of such spring to the other cup, it will be evident that relative rotation of the cups in the direction tending to unwind the spring will cause the spring to expand into firm frictional engagement with the inner walls of the cups to clutch the two cups together. In the construction which we prefer, the coil spring 37 is always in positive operative engagement with one of the cups, and means is provided for operatively connecting the other spring-end to the other cup.

As shown, the cup 35 is formed integral with the gear 14 and is received within a counterbored portion of the recess in the cup 36 which is rigidly mounted on the shaft 11. For the purpose of mounting the cup 36 and the other clutch-cups so that they will all rotate with the shaft 11, we prefer to provide the shaft 11 with splines 11′, although this particular means for interconnecting the shaft 11 and the clutch-cups is not essential. The spring 37 is provided with an out-bent end 38 adapted to be received within a hole in the bottom of the cup 35 in order to provide an operative interconnection between the spring 37 and cup 35. The spring 37 extends into the cup 36, the recess in which is preferably reduced in diameter at the end of the spring 37 to provide a shoulder against which the spring 37 bears to prevent axial separation of the spring turns or axial movement of the spring as a whole.

Axially slidable within and rotatable with the cup 36 is a clutch-actuating member 40 adapted to be moved into and out of engagement with the adjacent end of the spring 37. The clutch-actuating member 40 is carried on a collar 41, conveniently a sheet-metal stamping, which is slidable on the shaft 11 within the cup 36. At its rear end, the collar 41 is provided with a flange having notches for the reception of the grooved ends of pins 42 which extend axially through holes in the bottom of the cup 36 and are rigidly mounted in a ring 43. The ring 43 is axially slidable relative to the shaft 11 and is conveniently mounted on a hub portion 44 of the cup 36. The ring 43 is provided with an annular groove 45 for the reception of a suitable shifting yoke (not shown) by which the ring 43 may be moved axially to its various positions.

By the construction described, the sleeve 41 and ring 43 all rotate with the cup 36.

The clutch-actuating member 40 is in the form of a ring provided with a peripheral series of teeth 50 adapted to engage the adjacent end of the spring 37 when the clutch-actuating member is moved forward (to the left) from its neutral position shown in Fig. 2. In order to avoid too sudden clutching action of the spring 37 when it is engaged by the clutch-actuating member 40, such member 40 is not directly connected to the collar 41, but is connected thereto through a friction clutch which permits but opposes rotation of the clutch-actuating member 40 relative to the collar 41. To this end, the clutch-actuating member 40 is carried between a shoulder on the collar 41 and a washer 55. A spring 56 acts between a suitable abutment on the collar 41 and the washer 55 and tends to grip the clutch-actuating member between such washer and the shoulder on the collar 41 and thus produces a frictional drag on the member 40 when it tends to rotate relatively to the collar 41.

With the clutch parts in the position shown in Fig. 2 of the drawings, all the clutches, including the direct-drive clutch, are disengaged, and the shafts 10 and 11 may freely rotate relatively to each other. To effect a direct connection between such two shafts, the ring 43 is moved forward (to the left in Fig. 2) to bring one of the teeth 50 on the clutch-actuating member 40 into engagement with the adjacent end of the spring 37. The torque thus exerted on the spring 37 by virtue of the frictional connection between the clutch-actuating member 40 and the collar 41, which rotates with the cup 36 and shaft 11, causes the spring 37 to unwind and thus to expand into firm frictional engagement with the inner walls of the cups 35 and 36. The interconnection of the shafts 10 and 11 thus effected is not sudden but is gradual, because the frictional mounting of the clutch-actuating member permits some relative rotation of the clutch-cups before the first spring-turn engages the wall of its associated recess, and following such engagement the other spring turns successively become operative. To disengage the spring 37 and permit free relative rotation of the shaft 10 and 11, the ring 43 is moved rearwardly sufficiently far to free the end of the spring 37 from the teeth of the clutch-actuating member 40. The spring 37 thereupon assumes its normal diameter and recedes from contact with the walls of the cups 35 and 36.

The other clutches embodied in my transmission are similar to the clutch just described. The intermediate-speed clutch operates between the gear 30 which is rotatable on the shaft 11 and a cup 60 which is fixed to such shaft. The gear 30 has a counterbored recess in its forward face, the larger diameter portion of such recess receiving the associated end of the cup 60 and the smaller diameter portion receiving a coil spring 61 which extends into the cup 60. The spring 61 has normally an external diameter slightly less than the diameter of the recesses in the gear 30 and cup 60 and is preferably provided with an out-bent end 61' which engages a hole in the bottom of the recess in the gear 30.

The forward end of the spring 61 may be connected to or disconnected from the cup 60 by clutch-actuating means substantially similar to those described in connection with the direct-drive clutch. This clutch-actuating means comprises a clutch-actuating member 65 provided with a peripheral series of teeth similar to the teeth on the clutch-actuating member 40 of the direct-drive clutch. The clutch-actuating member 65 is mounted on an axially slidable sleeve 66 which is connected by pins 67 with an axially slidable ring which may conveniently be the ring 43 in which the pins 42 of the direct-drive clutch are mounted. For ease in assembling, we prefer to mount the pins 67 in a plane at right angles to the plane of the pins 42 as shown in Fig. 1 of the drawings, but in Fig. 2, for clearness of illustration, we have shown the pins 67 as revolved into the plane of the section. The clutch-actuating member 65 is frictionally connected to the sleeve 66 as by being mounted between a shoulder on such sleeve and a washer 68 spring pressed against the clutch-actuating member 65 by a spring 69 which acts between such washer 68 and a second washer 70 rigid with the sleeve 66.

The gears 31 and 32 are provided with counter-bored recesses in their adjacent faces for the reception respectively of cups 75 and 76 which are rigid with the shaft 11. A coil spring 77 is operatively connected to the gear 31 and extends into a recess in the cup 75. A second coil spring 78 is operatively connected to the gear 32 and extends into the recess in the cup 76. The coil springs 77 and 78 are provided respectively with clutch-actuating members 79 and 80 similar to the clutch-actuating member 40 of the direct-drive clutch. The clutch-actuating members 79 and 80 are mounted respectively on collars 81 and 82, being frictionally interconnected with such collars by means of the washers 83 and springs 84. The cups 75 and 76 have hub portions 85 and 86 respectively upon which is slidable a ring 87 having a yoke-receiving peripheral groove 88. Pins 89 extending through the bottom of the cup 75 connect the collar 81 with the ring 87, such ring being also connected to the collar 82 by pins 90 which extend through the bottom of the cup 76. The pins 89 preferably lie in a plane at right angles to the plane of the pins 90, as do the corresponding pins carried by the clutch-operating ring 43; but for clearness of illustration, in Fig. 2 of the drawings, the pins 90 are illustrated as rotated into the plane of the section.

To retain the ring 43 in its various positions of adjustment, we provide in its inner face three grooves or notches adapted to be engaged by an outwardly spring pressed ball 95 mounted in the hub portions of the cups 36 and 60. The ball 95 co-operates with the grooves or notches in the inner face of the ring 43 to hold the ring in its central or neutral position, in a position where the clutch-actuating member 40 engages the clutch-spring 37, and in a position where the clutch-actuating member 65 engages the intermediate-clutch spring 61. A similar spring-pressed ball 100 co-operates with grooves or notches in the inner face of the ring 87 to hold such ring in any of its positions of adjustment.

The springs 37, 61, 77, and 78 are wound so that they will tend to unwind and expand when they transmit a driving torque from the shaft 10 to the shaft 11. As was stated early in this specification, it was assumed that the shaft 11 was connected to the rear axle of an automobile while the shaft 10 was connected to an automobile engine which rotates in a clockwise direction when viewed from the front of the automobile. In such a construction, the gears 14, 30, and 31 all rotate in a clockwise direction when viewed from the forward end (the left-hand end of Figs. 1 and 2) of the transmission. Therefore, the spring 37 will be a right-hand spring in order that it may unwind when transmitting engine torque to the shaft 11. In order that it may unwind when transmitting engine torque to the shaft 11, the spring 61 is a left-hand spring; for its rear end is connected to the gear 30 and its forward end to the shaft 11, whereas with the spring 37 the rear end is connected to the shaft 11. The spring 77, like the spring 37, is a right-hand spring. The spring 78 is also a right-hand spring, for although its forward end is connected to the shaft 11, the gear 32 rotates oppositely to the gears 14, 30, and 31. It will be evident that the direction of inclination of the teeth on the various clutch-actuating members will depend upon whether the associated spring is a right-hand wound spring or a left-hand wound spring.

While the engine normally drives the automobile, it sometimes happens that the automobile has a tendency to drive the engine, as for example when the automobile is in gear and descending a hill. Under such circumstances, the two clutch members associated with the spring which is at the time being employed to interconnect the shafts 10 and 11 tend to rotate in a direction to wind the spring thus causing the spring to be reduced in diameter and to recede from the walls of the recesses in its associated members to permit their free relative rotation.

This may be advantageous in certain cases, but unless additional means is provided it prevents the use of the engine as a brake.

To permit the engine to be used as a brake, it is necessary to provide a means for positively interconnecting it with the rear wheels irrespective of whether the engine is driving the rear wheels or the rear wheels are driving the engine. Such a means may be provided to operate at any of the gear-ratios provided by the transmission; but as the intermediate-speed is the only one ordinarily used when employing the engine as a brake, I prefer to provide only the intermediate-speed gear with a clutch which will operate when the automobile tends to drive the engine.

For this purpose, we provide the gear 30 with a rearwardly extending portion having an axial counterbored recess, the larger diameter portion of which receives a clutch-cup 105 rigid with the shaft 11. A coil-spring 106 is operatively connected to the clutch-cup 105 and extends into the recess of the gear 30. A clutch-actuating member 107 similar to the clutch-actuating members of the other clutches is mounted in an axially slidable sleeve 108. The clutch-actuating member 107 is located between a shoulder on the sleeve 108 and a washer 109 spring pressed against the clutch-actuating member 107 by means of a coil spring 110 which operates between a washer 109 and a collar 111 rigid with the sleeve 108. The sleeve 108 is interconnected with the sleeve 66 which carries the clutch-actuating member 65 of the intermediate-speed clutch. To this end a ring 115 is mounted between the washer 70 and a shouldered collar 116 which may be screw-threadedly mounted on the sleeve 66. The shoulder on the collar 116 is of such a height that the ring 115 may rotate freely relative to the sleeve 66 when the end of such shoulder engages the washer 70. The ring 115 is directly connected to the sleeve 108 by means of pins 117 which extend through the wall separating the recesses in the opposite faces of the gear 30. Thus, whenever the ring 43 is moved rearwardly to bring the clutch-actuating member 65 into engagement with the end of the spring 61, the sleeve 108 will likewise be moved rearwardly to bring the clutch actuating member 107 into engagement with the end of the spring 106. The spring 106 is a left-hand wound spring in order that it may expand and clutch the gear 30 to the shaft 11 whenever the shaft 11 tends to rotate in a forward direction at a rotational speed greater than that of the gear 30. The external diameter of the spring 106 is less than the diameter of its associated recesses in the gear 30 and cups 105, and hence is inoperative except when the transmission is in intermediate-speed condition.

In Figs. 4 to 7 inclusive of the drawings we have illustrated modifications of the clutch-actuating means shown in Fig. 2. These modifications are all shown in connection with the direct-drive clutch, but they are equally applicable to any of the clutches.

In the construction shown in Fig. 4, the spring 37 is operatively connected to a friction clutch member 110 which is rotatably supported from the shaft 11 preferably through an anti-friction bearing 111. The clutch member 110 has a conical friction face complementary to a conical face on a second friction clutch member 112 which is connected as by pins 113 to the clutch-actuating ring 43. When this clutch is out of engagement, the shaft 11 stationary, and the shaft 10 rotating in its assumed direction of rotation, the friction-clutch member 110 rotates with the spring 37 and gear 14, while the friction-clutch member 112 remains stationary with the shaft 11 and cup 36. If the clutch-actuating ring 43 is moved to the left to bring the friction-clutch members 110 and 112 into engagement, the clutch member 110 is retarded to cause the spring 37 to unwind and to expand to clutch the two cups 35 and 36 firmly together.

The modification of our invention illustrated in Figs. 5 and 7 is somewhat similar to that shown in Fig. 4. A friction-clutch member 115a is connected to the adjacent end of the spring 37 exactly as the clutch member 110 is connected in Fig. 4. The clutch member 115a, however, instead of being carried by the shaft 11, is supported by the cup 35. Its only rotational movement relative to such cup is that required to expand and contract the spring, so that it is only necessary that provision be made for a slight oscillation of the friction-clutch member 115. To this end, the clutch member 115a is provided at its forward end with an inwardly extending annular flange 116a in which are a plurality of arcuate slots for the reception of screws 117 adapted to hold the clutch member 115a in place in the cup 35. Preferably, some form of anti-friction bearing such as the balls 118 is provided between the clutch member 115a and the cup 35. At its rear end, the friction-clutch member 115a is provided with a conical clutch face complementary to the clutch face of a second clutch member 119 which is connected by pins 119' to the ring 43. The operation of this device is substantially the same as that of the device shown in Fig. 4.

In Fig. 6 is shown a clutch construction more closely approximating that shown in Fig. 2. In this construction a sleeve 120 is slidably mounted on the shaft 11 and carries a clutch-actuating member 121 provided with a peripheral series of teeth similar to the teeth on the clutch-actuating member 40. The sleeve 120 is provided with a flange 122, against which the clutch-actuating member 121 is held by means of a spring 123 which acts between an abutment 124 on the sleeve 120 and a friction ring 125 which is axially slidable on the sleeve 120 but which rotates therewith. The clutch-actuating member 121 and the ring 125 are provided with complementary friction clutch faces. The operation of this device is substantially similar to that of the clutches illustrated in Fig. 2. The shaft 10 may rotate in its assumed direction while the shaft 11 remains stationary so long as the parts have the position illustrated in Fig. 6. If the ring 43 is moved to the left, one of the teeth on the clutch actuating member 121 would engage the end of the spring 37 and cause the spring to unwind to clutch the two cups 35 and 36 firmly together.

We claim as our invention:

1. A clutch, comprising two relatively rotatable members, a coil spring operatively connected to one of such members and extending into an axial recess in the other of such members, the normal external diameter of such spring being less than the diameter of such recess, and manually operable releasable means for operatively connecting said recessed member to said spring to cause said spring to expand into engagement with the wall of its associated recess when said two relatively rotatable members tend to rotate in a direction to unwind said spring, said means including parts adapted for a frictional engagement with one end of said spring so as to permit but oppose relative rotation of said recessed member and said spring.

2. A change speed transmission, comprising rotatable driving and driven elements, a plurality of selectively operable, power transmitting mechanisms of different speed ratios including constant mesh gearing for interconnecting said driving and driven elements, the mechanism of highest speed ratio including an overrunning clutch permitting free relative rotation of the driving and driven elements in one direction and a mechanism of lower speed ratio including means for preventing free relative rotation of the driving and driven elements in either direction.

3. A change speed transmission, comprising rotatable driving and driven elements, a plurality of members coaxial with said driven element and rotatable relatively thereto, means for permanently operatively connecting said members with said driving element whereby they may be driven at different speeds, selectively operable control means for operatively connecting said rotatable members to said driven element, said control means including overrunning clutch mechanism permitting free relative rotation of said driving and driven elements in one direction, and provisions associated with at least one of said rotatable members for preventing free relative rotation of said driving and driven elements in either direction.

4. A change speed transmission, comprising rotatable driving and driven elements, a plurality of members coaxial with said driven element and rotatable relatively thereto, said rotatable members being spaced from each other axially of said driven element, means for permanently operatively connecting said rotatable members with said driving element whereby they may be driven at different speeds, an overrunning clutch, control mechanism including a member located between two of said rotatable members, said control member being movable axially of said driven element from a neutral position toward either of the rotatable members between which it is disposed, means rendered operative by movement of said control member toward one of said rotatable members for operatively connecting such rotatable member to said driven element through said overrunning clutch, and means rendered operative by movement of said control member toward the other of said rotatable members for positively interconnecting that rotatable member and the driven element.

In witness whereof, we have hereunto set our hands at Indianapolis, Indiana, this 29th day of July, A. D. one thousand nine hundred and twenty six.

WILLIAM CARLETON STARKEY.
DALMAR T. BROWNLEE.